United States Patent
Chen (10) Patent No.: US 10,915,182 B2
(45) Date of Patent: Feb. 9, 2021

(54) KEYBOARD

(71) Applicant: Chicony Electronics Co., Ltd., New Taipei (TW)

(72) Inventor: Chia-Hsin Chen, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/167,510

(22) Filed: Oct. 22, 2018

(65) Prior Publication Data

US 2020/0064926 A1    Feb. 27, 2020

(30) Foreign Application Priority Data

Aug. 23, 2018 (TW) .............. 107129510 A (51) Int. Cl.
  *H01H 13/83* (2006.01)
  *G06F 3/02* (2006.01)
  *F21V 8/00* (2006.01)

(52) U.S. Cl.
  CPC ......... *G06F 3/0202* (2013.01); *G02B 6/0055* (2013.01); *G02B 6/0088* (2013.01); *H01H 13/83* (2013.01); *H01H 2209/068* (2013.01); *H01H 2219/062* (2013.01)

(58) Field of Classification Search
  CPC ............. H01H 13/83; H01H 2219/062; H01H 13/023; H01H 2219/036; H01H 2219/056; H01H 2221/07; H01H 9/161; H01H 2219/044; H01H 9/182; H01H 19/025; H01H 2219/014; H01H 13/14; H01H 3/125; H01H 2221/044; H01H 13/705; H01H 13/70; H01H 2221/036; H01H 13/7006; H01H 13/20
  See application file for complete search history.

(56) References Cited

U.S. PATENT DOCUMENTS

| 8,517,549 B2 * | 8/2013 | Yao ................. | G06F 3/0202 362/23.03 |
| 2012/0018289 A1 * | 1/2012 | Hwa ................ | G06F 3/0202 200/5 A |
| 2013/0087440 A1 * | 4/2013 | Huang ............... | H01H 3/125 200/314 |
| 2015/0107974 A1 * | 4/2015 | Huang ............... | H01H 13/83 200/5 A |
| 2018/0182575 A1 * | 6/2018 | Chiu ................. | H01H 13/85 |

FOREIGN PATENT DOCUMENTS

CN   202434396 U   9/2012
TW   M497846 U    3/2015

* cited by examiner

*Primary Examiner* — Ahmed M Saeed
(74) *Attorney, Agent, or Firm* — CKC & Partners Co., LLC (57) ABSTRACT

A keyboard includes a base plate, a membrane circuit board, a backlight module, and a plurality of keyswitch assemblies. The base plate has a plurality of through holes. The membrane circuit board is disposed on the base plate. The backlight module is disposed at a side of the base plate away from the membrane circuit board and configured to emit light toward the base plate. The keyswitch assemblies are disposed on the membrane circuit board. Each of the keyswitch assemblies includes a position-returning member located over one of the through holes. An orthogonal projection of the position-returning member projected on the base plate overlaps a part of said one of the through holes.

22 Claims, 7 Drawing Sheets

KEYBOARD

CROSS-REFERENCE TO RELATED APPLICATION

This application claims priority to Taiwan Application Serial Number 107129510, filed Aug. 23, 2018, which is herein incorporated by reference.

BACKGROUND

Technical Field

The present disclosure relates to a keyboard.

Description of Related Art

Currently, the keyswitch device is one of the indispensable input devices to enter text or numbers while using a personal computer (PC). Moreover, consumer electronic products used in daily life or large-scale processing equipment used in the industrial sector require key structure units as input devices to be operated.

In order to make it easier to use in dark places, LED (Light-Emitting Diode) keyboards have been developed on the market for users, so that diversity of keyboards has been increased. The known practice is to respectively install LEDs under all keyswitches (or certain keyswitches) of a keyboard. There is a known illuminated keyboard including LEDs directly disposed on a membrane circuit board and emitting lights toward keycaps of keyswitches. However, the design may cause unevenness of luminosity on the keycaps. That is, the design may confine the light-emitting regions at small areas of the keycaps, which also affect the user's visual experience.

In addition, current computer products are developed to be light, thin, short, and small, and keyboards are no exception. Under this development trend, when the thickness of the above-mentioned illuminated keyboard is reduced, the stroke of the keycap might be too small and the feel of pressing the keycap might become worse.

Accordingly, how to provide a keyboard to solve the aforementioned problems becomes an important issue to be solved by those in the industry.

SUMMARY

An aspect of the disclosure is to provide a keyboard that can efficiently solve the aforementioned problems.

According to an embodiment of the disclosure, a keyboard includes a base plate, a membrane circuit board, a backlight module, and a plurality of keyswitch assemblies. The base plate has a plurality of through holes. The membrane circuit board is disposed on the base plate. The backlight module is disposed at a side of the base plate away from the membrane circuit board and configured to emit light toward the base plate. The keyswitch assemblies are disposed on the membrane circuit board. Each of the keyswitch assemblies includes a position-returning member located over one of the through holes. An orthogonal projection of the position-returning member projected on the base plate overlaps a part of said one of the through holes.

In an embodiment of the disclosure, the orthogonal projection of the position-returning member projected on the base plate is entirely located in a range within an inner edge of said one of the through holes.

In an embodiment of the disclosure, the keyboard further includes a light-shielding layer disposed between the membrane circuit board and the position-returning member. An orthogonal projection of the light-shielding layer projected on the membrane circuit board covers an orthogonal projection of the position-returning member projected on the membrane circuit board.

In an embodiment of the disclosure, the keyboard further includes a light-shielding layer located between the backlight module and the position-returning member. An orthogonal projection of the light-shielding layer projected on the membrane circuit board covers an orthogonal projection of the position-returning member projected on the membrane circuit board.

In an embodiment of the disclosure, the light-shielding layer is disposed at a side of the membrane circuit board facing toward the base plate.

In an embodiment of the disclosure, the light-shielding layer is disposed on the backlight module.

In an embodiment of the disclosure, the backlight module includes a reflective sheet, a light-shielding sheet, and a light guide plate. The light-shielding sheet is located at a side of the reflective sheet adjacent to the base plate. The light-shielding layer is disposed at a side of the light-shielding sheet adjacent to the base plate. The light guide plate is sandwiched between the reflective sheet and the light-shielding sheet.

In an embodiment of the disclosure, the backlight module includes a reflective sheet, a light-shielding sheet, and a light guide plate. The light-shielding sheet is located at a side of the reflective sheet adjacent to the base plate. The light guide plate is sandwiched between the reflective sheet and the light-shielding sheet. The light-shielding layer is disposed between the light-shielding sheet and the light guide plate.

In an embodiment of the disclosure, an orthogonal projection of the light-shielding layer projected on the base plate covers said one of the through holes.

In an embodiment of the disclosure, an outer edge of the light-shielding layer is entirely connected to an inner edge of said one of the through holes.

According to an embodiment of the disclosure, a keyboard includes a base plate, a membrane circuit board, a backlight module, a plurality of keyswitch assemblies, and a light-shielding layer. The base plate has a plurality of through holes. The membrane circuit board is disposed on the base plate. The backlight module is disposed at a side of the base plate away from the membrane circuit board and configured to emit light toward the base plate. The keyswitch assemblies are disposed on the membrane circuit board. Each of the keyswitch assemblies includes a position-returning member located over one of the through holes. The light-shielding layer is disposed between the backlight module and the position-returning member. An orthogonal projection of the light-shielding layer projected on the membrane circuit board covers an orthogonal projection of the position-returning member projected on the membrane circuit board.

Accordingly, in the keyboard of the present disclosure, the range of the through hole on the base plate is greater than the orthogonal projection of the position-returning member projected on the base plate, so when the membrane circuit board is downwardly squeezed by the position-returning member, the through hole of the base plate can increase the stroke of the keycap, thereby making the feel of pressing the keycap better. In addition, because the orthogonal projection of the light-shielding layer (disposed between the backlight module and the position-returning member) projected on the base plate covers the through hole, or an outer edge of the light-shielding layer is entirely connected to an inner edge of the through hole, the light emitted into the through hole from the backlight module can be blocked by the light-shielding layer without reaching the keyswitch assembly via the position-returning member, so as to avoid confining the light-emitting region at a small central area of the keyswitch assembly.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing exemplary embodiments, and thus may be embodied in many alternate forms and should not be construed as limited to only example embodiments set forth herein. Therefore, it should be understood that there is no intent to limit exemplary embodiments to the particular forms disclosed, but on the contrary, exemplary embodiments are to cover all modifications, equivalents, and alternatives falling within the scope of the disclosure.

Figure 1:
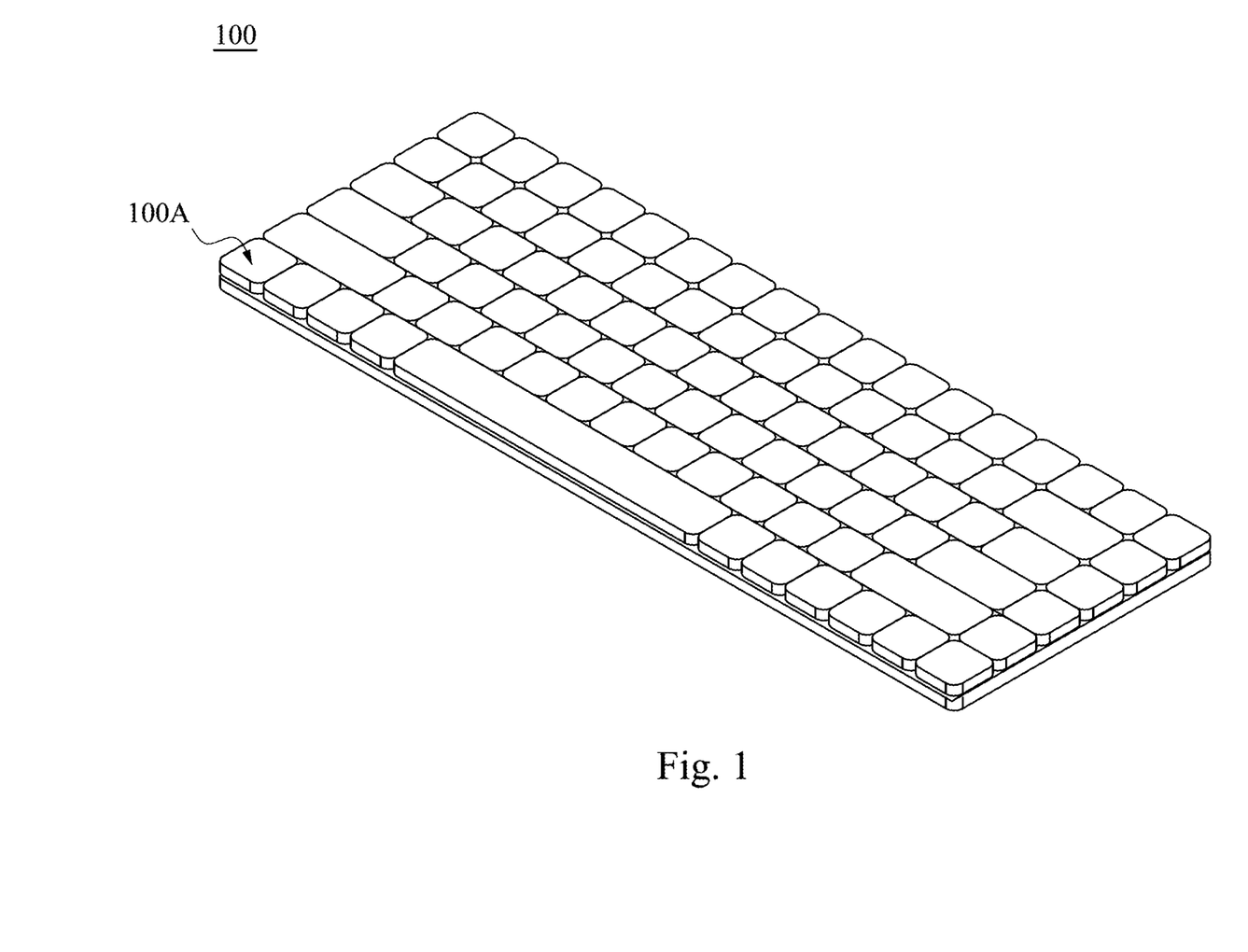
FIG. 1 is a perspective view of a keyboard according to some embodiments of the disclosure.
Figure 2A:
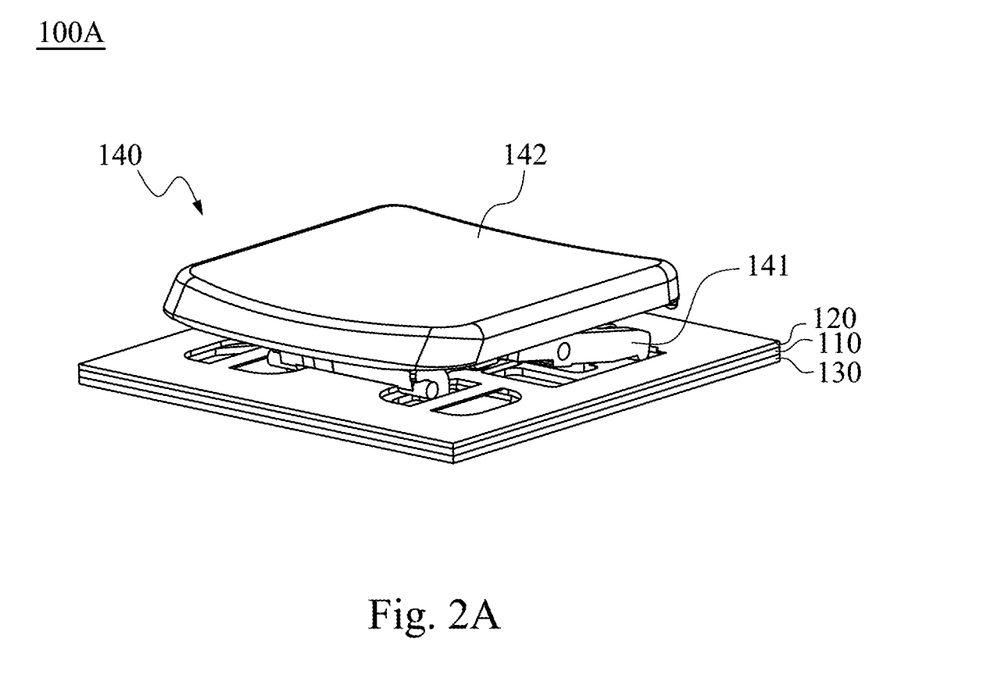
FIG. 2A is a perspective view of a keyswitch device according to some embodiments of the disclosure.
Figure 2B:
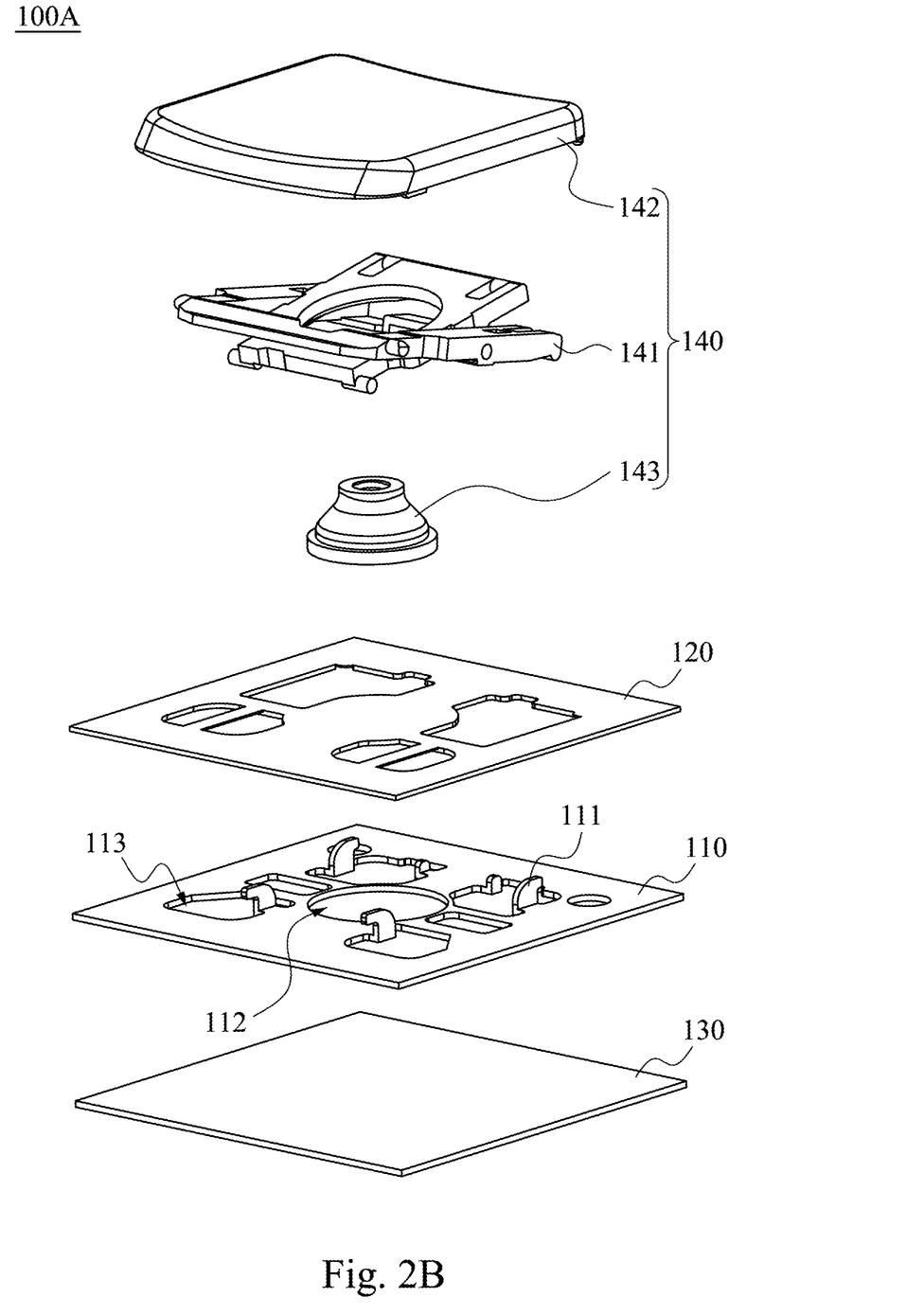
FIG. 2B is an exploded view of the keyswitch device shown in FIG. 2A.

Reference is made to FIGS. 1-2B. FIG. 1 is a perspective view of a keyboard 100 according to some embodiments of the disclosure. FIG. 2A is a perspective view of a keyswitch device 100A according to some embodiments of the disclosure. FIG. 2B is an exploded view of the keyswitch device 100A shown in FIG. 2A. As shown in FIGS. 2A and 2B, the keyboard 100 of the disclosure can be an external keyboard (e.g., a keyboard with a PS/2 interface or a keyboard with a USB interface) used in a desktop computer, or can be a part of a computer system having an input device that is in the form of a keyswitch, but the disclosure is not limited in this regard. That is, concepts of the keyboard 100 of the disclosure can be used in any electronic product that performs input function by pressing.

As shown in FIGS. 1-2B, in some embodiments, the keyboard 100 includes a base plate 110, a membrane circuit board 120, and a plurality of keyswitch assemblies 140, in which the base plate 110, the membrane circuit board 120, and one of the keyswitch assemblies 140 can be regarded as at least a part of a single keyswitch device 100A. The membrane circuit board 120 is disposed on the base plate 110. The keyswitch assembly 140 is disposed on the membrane circuit board 120.

Specifically, hooks 111 are extended from the base plate 110. The membrane circuit board 120 correspondingly has hollow holes (not shown) for the hooks 111 of the base plate 110 to pass through. The keyswitch assembly 140 of the keyswitch device 100A includes a connection guiding structure 141, a keycap 142, and a position-returning member 143. In the embodiment as shown in FIG. 2B, the connection guiding structure 141 is connected between the base plate 110 and the keycap 142 and consisting of two linkages pivotally connected to each other, so as to guide the keycap 142 to vertically move relative to the base plate 110. The position-returning member 143 is disposed over the membrane circuit board 120 and between the keycap 142 and the membrane circuit board 120. When the keycap 142 is pressed downwards by an external force, the position-returning member 143 generates a counterforce to the keycap 142 so as to provide users the feeling of pressing. When the external force applied onto the keycap 142 is released, the position-returning member 143 can provide a restoring force for returning the keycap 142 back to its original position at which the keycap 142 is not pressed.

In the embodiment as shown in FIG. 2B, the position-returning member 143 is a resilient member, such as a rubber dome, but the disclosure is not limited in this regard. In practical applications, the connection guiding structure 141 can be replaced by other structures having similar functions (i.e., moving the keycap 142 relative to the base plate 110), such as a V-shaped linkage structure, an A-shaped linkage structure, or a linkage structure having two parallel linkages. The position-returning member 143 can be replaced by other component having similar functions, such as magnetic components.

In some embodiments, the base plate 110 may be made of hard materials (e.g., metals or plastics), but the disclosure is not limited in this regard. In some embodiments, the membrane circuit board 120 is consisting of light-permeable stacking layers, but the disclosure is not limited in this regard.

Figure 3:
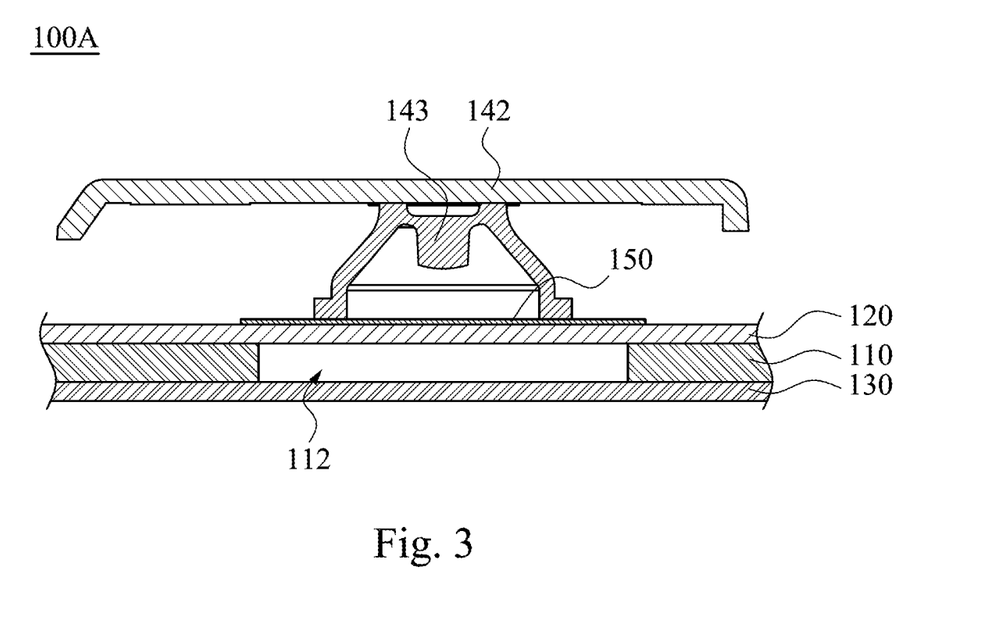
FIG. 3 is a cross-sectional view of a keyswitch device according to some embodiments of the disclosure, in which a connection guiding structure is omitted without drawing.
Figure 4:
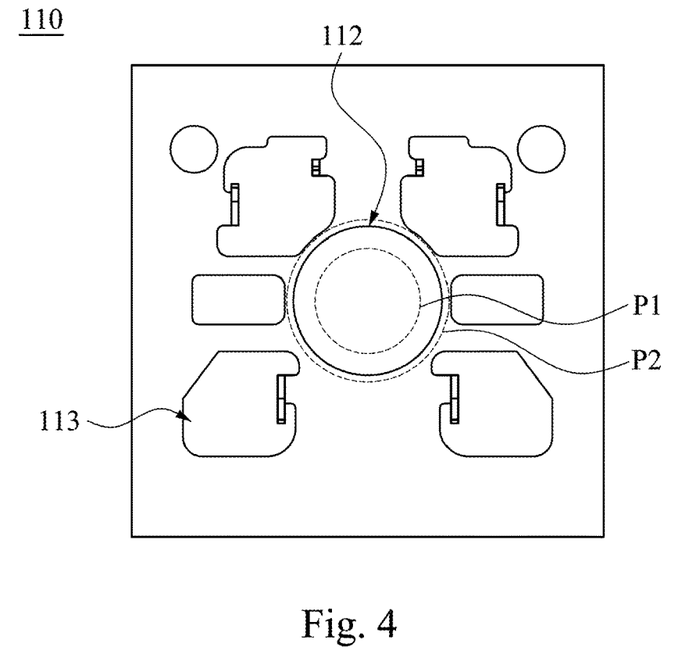
FIG. 4 is a top view of a base plate according to some embodiments of the disclosure.

Reference is made to FIGS. 3 and 4. FIG. 3 is a cross-sectional view of the keyswitch device 100A according to some embodiments of the disclosure, in which the connection guiding structure 141 is omitted without drawing. FIG. 4 is a top view of the base plate 110 according to some embodiments of the disclosure.

As shown in FIGS. 2B, 3, and 4, in some embodiments, the center of the base plate 110 has a through hole 112. The position-returning member 143 is over the through hole 112. The base plate 110 further has a plurality of light transmitting portions 113 surrounding the through hole 112. Some of the light transmitting portions 113 are connected to the hooks 111. Especially, an orthogonal projection P1 (referring to FIG. 4) of the position-returning member 143 projected on the base plate 110 overlaps a part of the through hole 112. Furthermore, the orthogonal projection P1 of the position-returning member 143 projected on the base plate 110 is entirely located in a range within an inner edge of the through hole 112. That is, the through hole 112 of the base plate 110 has a ring-shaped region that protrudes outward relative to and does not overlap the orthogonal projection P1 of the position-returning member 143 projected on the base plate 110. The keyboard 100 further includes a backlight module 130, in which the backlight module 130 can also be regarded as a part of the keyswitch device 100A. The backlight module 130 is disposed at a side of the base plate 110 away from the membrane circuit board 120 and configured to emit light toward the base plate 110.

With the foregoing structural configurations, the light emitted toward the base plate 110 by the backlight module 130 can reach the keyswitch assembly 140 (e.g., the keycap 142) above through the membrane circuit board 120 at least from the light transmitting portions 113 of the base plate 110. Moreover, the range of the through hole 112 on the base plate 110 is greater than the orthogonal projection P1 of the position-returning member 143, so when the membrane circuit board 120 is downwardly squeezed by the position-returning member 143, the through hole 112 of the base plate 110 can increase the stroke of the keycap 142, thereby making the feel of pressing the keycap 142 better.

In the embodiment as shown in FIG. 4, the orthogonal projection P1 of the position-returning member 143 projected on the base plate 110 and the through hole 112 on the base plate 110 are both circular for example, but the disclosure is not limited in this regard. In practical applications, at least one of the orthogonal projection P1 of the position-returning member 143 projected on the base plate 110 and the through hole 112 on the base plate 110 may have an irregular shape.

As shown in FIGS. 2B, 3, and 4, in some embodiments, the keyswitch device 100A further includes a light-shielding layer 150. The light-shielding layer 150 is disposed between the membrane circuit board 120 and the position-returning member 143. An orthogonal projection P2 of the light-shielding layer 150 projected on the base plate 110 covers the through hole 112. Furthermore, the orthogonal projection P2 covers the orthogonal projection P1, so it is clear that the orthogonal projection of the light-shielding layer 150 projected on the membrane circuit board 120 covers an orthogonal projection of the position-returning member 143 projected on the membrane circuit board 120.

With the foregoing structural configurations, the light emitted into the through hole 112 from the backlight module 130 can be blocked by the light-shielding layer 150 without reaching the keyswitch assembly 140 via the position-returning member 143, so as to avoid confining the light-emitting region at a small central area of the keyswitch assembly 140.

In some embodiments, the orthogonal projection P2 of the light-shielding layer 150 projected on the base plate 110 completely coincides with the through hole 112.

Figure 5:
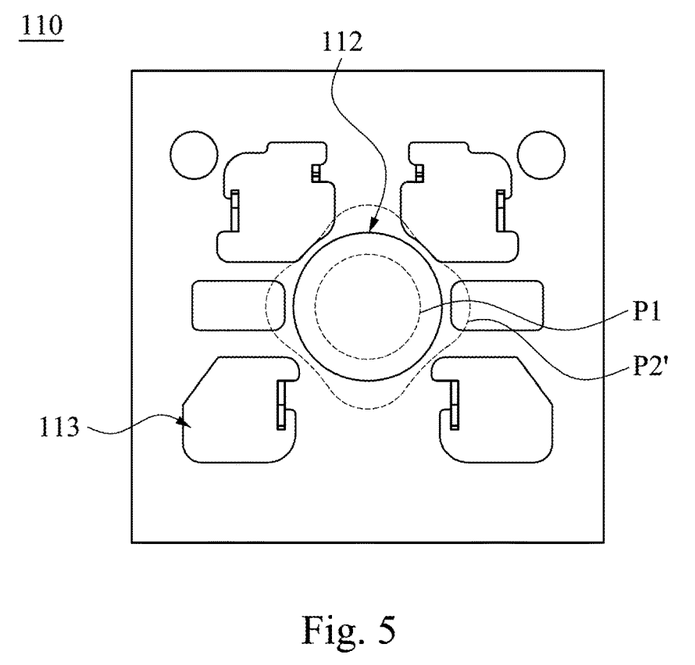
FIG. 5 is a top view of a base plate according to some embodiments of the disclosure.

In the embodiment as shown in FIG. 4, the orthogonal projection P2 of the light-shielding layer 150 projected on the base plate 110 is circular for example, but the disclosure is not limited in this regard. Reference is made to FIG. 5. FIG. 5 is a top view of a base plate 110 according to some embodiments of the disclosure. Compared with the embodiment shown in FIG. 4, an orthogonal projection P2' of the light-shielding layer 150 projected on the base plate 110 shown in FIG. 5 has an irregular shape. However, as long as the orthogonal projection P2' of the light-shielding layer 150 projected on the base plate 110 can cover the through hole 112 of the base plate 110 and the orthogonal projection of the light-shielding layer 150 projected on the membrane circuit board 120 covers the orthogonal projection of the position-returning member 143 projected on the membrane circuit board 120, the light emitted into the through hole 112 from the backlight module 130 can be blocked by the light-shielding layer 150 without reaching the keyswitch assembly 140 above via the position-returning member 143. In addition, the orthogonal projection P2' of the light-shielding layer 150 projected on the base plate 110 may partially overlap the light transmitting portions 113, so as to modify the light shape of the light reaching the keyswitch assembly 140 via the base plate 110 and the membrane circuit board 120 from the backlight module 130.

In some embodiments, the light-shielding layer 150 is a black ink layer and can be formed on the membrane circuit board 120 by printing, but the disclosure is not limited in this regard.

Figure 6:
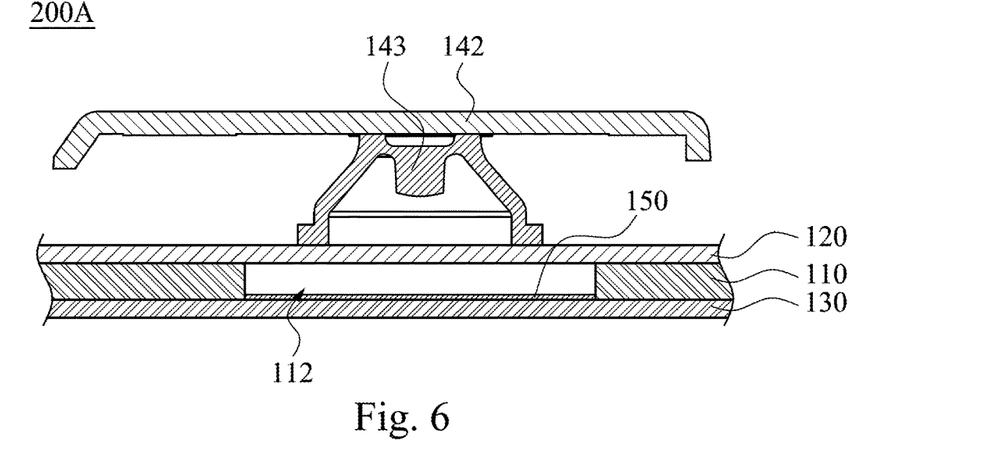
FIG. 6 is a cross-sectional view of a keyswitch device according to some embodiments of the disclosure, in which the connection guiding structure is omitted without drawing.
Figure 7:
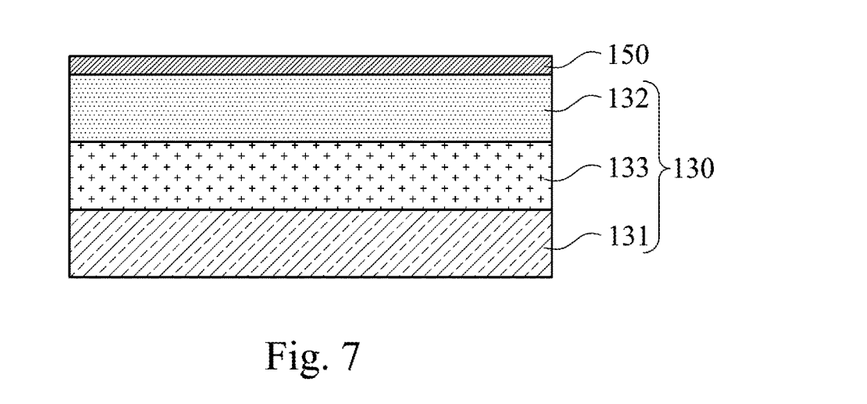
FIG. 7 is a partial cross-sectional view of a light-shielding layer and a backlight module shown in FIG. 6.

Reference is made to FIGS. 6 and 7. FIG. 6 is a cross-sectional view of a keyswitch device 200A according to some embodiments of the disclosure, in which the connection guiding structure 141 is omitted without drawing. FIG. 7 is a partial cross-sectional view of a light-shielding layer 150 and a backlight module 130 shown in FIG. 6. A difference between the present embodiment and the embodiment shown in FIG. 3 is that the light-shielding layer 150 of the present embodiment is disposed on the backlight module 130. Specifically, as shown in FIG. 7, the backlight module 130 includes a reflective sheet 131, a light-shielding sheet 132, and a light guide plate 133. The light-shielding sheet 132 is located at a side of the reflective sheet 131 adjacent to the base plate 110. The light-shielding layer 150 is disposed at a side of the light-shielding sheet 132 adjacent to the base plate 110. The light guide plate 133 is sandwiched between the reflective sheet 131 and the light-shielding sheet 132. Specifically, an outer edge of the light-shielding layer 150 is entirely connected to an inner edge of the through hole 112.

With the foregoing structural configurations, the light in the backlight module 130 can be reflected between the light-shielding sheet 132 and the light guide plate 133 to increase the uniformity of light. Because the light-shielding layer 150 entirely blocks the path of the light into the through hole 112 of the base plate 110, the purpose of avoiding the light emitted by the backlight module 130 reaching the keyswitch assembly 140 above via the position-returning member 143 can be achieved.

Figure 8:
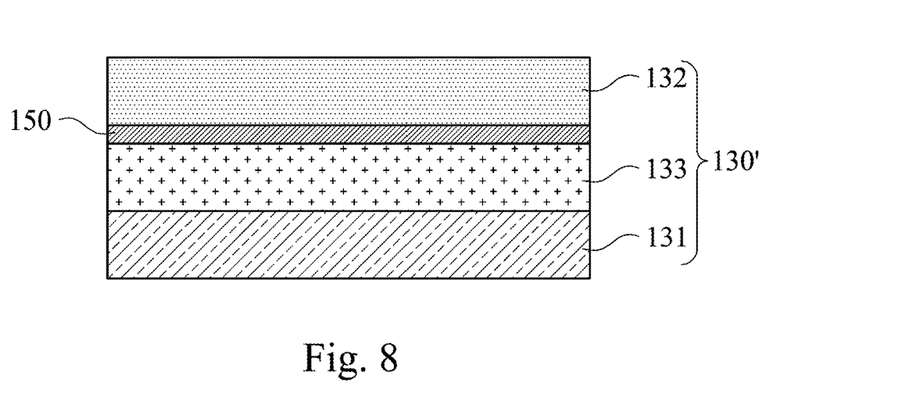
FIG. 8 is a partial cross-sectional view of a light-shielding layer and a backlight module according to some embodiments of the disclosure.

Reference is made to FIG. 8. FIG. 8 is a partial cross-sectional view of a light-shielding layer 150 and a backlight module 130' according to some embodiments of the disclosure. A difference between the present embodiment and the embodiment shown in FIG. 7 is that the light-shielding layer 150 of the present embodiment is disposed between the light-shielding sheet 132 and the light guide plate 133. Specifically, the orthogonal projection of the light-shielding layer 150 projected on the base plate 110 covers the through hole 112 (also referred to FIG. 3).

With the foregoing structural configurations, the light in the backlight module 130' can be reflected between the light-shielding layer 150 and the reflective sheet 131 to increase the uniformity of light. Because the light-shielding layer 150 entirely blocks the path of the light into the through hole 112 of the base plate 110, the purpose of avoiding the light emitted by the backlight module 130' reaching the keyswitch assembly 140 above via the position-returning member 143 can be achieved.

Figure 9:
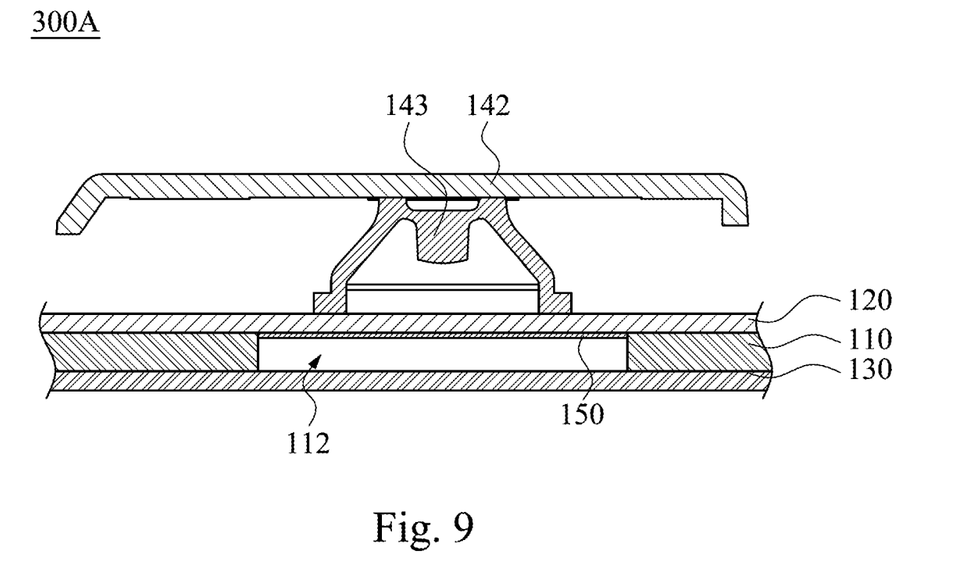
FIG. 9 is a cross-sectional view of a keyswitch device according to some embodiments of the disclosure, in which the connection guiding structure is omitted without drawing.

Reference is made to FIG. 9. FIG. 9 is a cross-sectional view of a keyswitch device 300A according to some embodiments of the disclosure, in which the connection guiding structure 141 is omitted without drawing. At least one difference between the present embodiment and the embodiment shown in FIG. 3 is that the light-shielding layer 150 of the present embodiment is disposed between the membrane circuit board 120 and the base plate 110. That is, the light-shielding layer 150 is disposed at a side of the membrane circuit board 120 facing toward the base plate 110. Specifically, an outer edge of the light-shielding layer 150 is entirely connected to an inner edge of the through hole 112.

With the foregoing structural configurations, the purpose of avoiding the light emitted by the backlight module 130 reaching the keyswitch assembly 140 above via the position-returning member 143 can be achieved.

According to the foregoing recitations of the embodiments of the disclosure, it can be seen that in the keyboard of the present disclosure, the range of the through hole on the base plate is greater than the orthogonal projection of the position-returning member projected on the base plate, so when the membrane circuit board is downwardly squeezed by the position-returning member, the through hole of the base plate can increase the stroke of the keycap, thereby making the feel of pressing the keycap better. In addition, because the orthogonal projection of the light-shielding layer (disposed between the backlight module and the position-returning member) projected on the base plate covers the through hole, or an outer edge of the light-shielding layer is entirely connected to an inner edge of the through hole, the light emitted into the through hole from the backlight module can be blocked by the light-shielding layer without reaching the keyswitch assembly via the position-returning member, so as to avoid confining the light-emitting region at a small central area of the keyswitch assembly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A keyboard, comprising:
   a base plate having a plurality of through holes;
   a membrane circuit board disposed on the base plate;
   a backlight module disposed at a side of the base plate away from the membrane circuit board and configured to emit light toward the base plate; and
   a plurality of keyswitch assemblies disposed on the membrane circuit board, each of the keyswitch assemblies comprising a position-returning member located over one of the through holes, wherein an orthogonal projection of the position-returning member projected on the base plate is entirely located in a range within an inner edge of said one of the through holes
   wherein:
   the backlight module has an upper surface; and
   an orthogonal projection of the position-returning member projected on the upper surface of the backlight module is spaced apart in a planar direction of the upper surface of the backlight module from an orthogonal projection of the inner edge of said one of the through holes projected on the upper surface of the backlight module.

2. The keyboard of claim 1, further comprising a light-shielding layer disposed between the membrane circuit board and the position-returning member, and an orthogonal projection of the light-shielding layer projected on the membrane circuit board covers an orthogonal projection of the position-returning member projected on the membrane circuit board.

3. The keyboard of claim 2, wherein an orthogonal projection of the light-shielding layer projected on the base plate covers said one of the through holes.

4. The keyboard of claim 1, further comprising a light-shielding layer located between the backlight module and the position-returning member, and an orthogonal projection of the light-shielding layer projected on the membrane circuit board covers an orthogonal projection of the position-returning member projected on the membrane circuit board.

5. The keyboard of claim 4, wherein the light-shielding layer is disposed at a side of the membrane circuit board facing toward the base plate.

6. The keyboard of claim 5, wherein an outer edge of the light-shielding layer is entirely connected to an inner edge of said one of the through holes.

7. The keyboard of claim 4, wherein the light-shielding layer is disposed on the backlight module.

8. The keyboard of claim 7, wherein the backlight module comprises:
   a reflective sheet;
   a light-shielding sheet located at a side of the reflective sheet adjacent to the base plate, wherein the light-shielding layer is disposed at a side of the light-shielding sheet adjacent to the base plate; and
   a light guide plate sandwiched between the reflective sheet and the light-shielding sheet.

9. The keyboard of claim 7, wherein the backlight module comprises:
   a reflective sheet;
   a light-shielding sheet located at a side of the reflective sheet adjacent to the base plate; and
   a light guide plate sandwiched between the reflective sheet and the light-shielding sheet, wherein the light-shielding layer is disposed between the light-shielding sheet and the light guide plate.

10. The keyboard of claim 1, wherein:
    an orthogonal projection of the light-shielding layer projected on the upper surface of the backlight module is outwardly disposed in the planar direction of the upper surface of the backlight module from the orthogonal projection of the inner edge of said one of the through holes projected on the upper surface of the backlight module; and
    an outer boundary of the orthogonal projection of the light-shielding layer projected on the upper surface of the backlight module is spaced apart in the planar direction of the upper surface of the backlight module from an outer boundary of the orthogonal projection of the position-retaining member projected on the upper surface of the backlight module.

11. The keyboard of claim 10, wherein a material of the light-shielding layer is different from a material of the position-retaining member.

12. The keyboard of claim 11, wherein the light-shielding layer comprises a black ink layer, and the position-retaining member comprises a rubber material.

13. A keyboard, comprising:
a base plate having a plurality of through holes;
a membrane circuit board disposed on the base plate;
a backlight module disposed at a side of the base plate away from the membrane circuit board and configured to emit light toward the base plate;
a plurality of keyswitch assemblies disposed on the membrane circuit board, each of the keyswitch assemblies comprising a position-returning member located over one of the through holes, wherein the membrane circuit board is disposed at a side of the base plate facing the keyswitch assemblies; and
a light-shielding layer disposed between the backlight module and the position-returning member and configured to avoid the light reaching the position-returning member via said one of the through holes, wherein an orthogonal projection of the light-shielding layer projected on the membrane circuit board covers an orthogonal projection of the position-returning member projected on the membrane circuit board.

14. The keyboard of claim 13, wherein the light-shielding layer is disposed between the membrane circuit board and the position-returning member.

15. The keyboard of claim 14, wherein an orthogonal projection of the light-shielding layer projected on the base plate covers said one of the through holes.

16. The keyboard of claim 13, wherein the light-shielding layer is disposed at a side of the membrane circuit board facing toward the base plate.

17. The keyboard of claim 16, wherein an outer edge of the light-shielding layer is entirely connected to an inner edge of said one of the through holes.

18. The keyboard of claim 13, wherein the light-shielding layer is disposed on the backlight module.

19. The keyboard of claim 18, wherein the backlight module comprises:
a reflective sheet;
a light-shielding sheet located at a side of the reflective sheet adjacent to the base plate, wherein the light-shielding layer is disposed at a side of the light-shielding sheet adjacent to the base plate; and
a light guide plate sandwiched between the reflective sheet and the light-shielding sheet.

20. The keyboard of claim 19, wherein an outer edge of the light-shielding layer is entirely connected to an inner edge of said one of the through holes.

21. The keyboard of claim 18, wherein the backlight module comprises:
a reflective sheet;
a light-shielding sheet located at a side of the reflective sheet adjacent to the base plate; and
a light guide plate sandwiched between the reflective sheet and the light-shielding sheet, wherein the light-shielding layer is disposed between the light-shielding sheet and the light guide plate.

22. The keyboard of claim 21, wherein an orthogonal projection of the light-shielding layer projected on the base plate covers said one of the through holes.

* * * * *